(12) United States Patent
Takaoka

(10) Patent No.: US 9,731,667 B2
(45) Date of Patent: Aug. 15, 2017

(54) ON-VEHICLE EQUIPMENT CONTROL SYSTEM AND VEHICLE

(71) Applicant: Toshifumi Takaoka, Nishikamo-gun (JP)

(72) Inventor: Toshifumi Takaoka, Nishikamo-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1047 days.

(21) Appl. No.: 13/938,596

(22) Filed: Jul. 10, 2013

(65) Prior Publication Data

US 2013/0300191 A1 Nov. 14, 2013

Related U.S. Application Data

(62) Division of application No. 12/450,801, filed as application No. PCT/JP2008/058442 on Apr. 24, 2008, now Pat. No. 8,515,605.

(30) Foreign Application Priority Data

May 23, 2007 (JP) .................................. 2007-136634

(51) Int. Cl.
*B60L 1/00* (2006.01)
*B60R 16/033* (2006.01)
(Continued)

(52) U.S. Cl.
CPC ............ *B60R 16/033* (2013.01); *B60K 6/365* (2013.01); *B60K 6/445* (2013.01); *B60L 3/0046* (2013.01);
(Continued)

(58) Field of Classification Search
CPC .... G01C 22/006; G01C 21/16; G01C 21/165; G01C 15/00; G01C 21/20; G01C 21/206
(Continued)

(56) References Cited

U.S. PATENT DOCUMENTS 5,422,558 A 6/1995 Stewart
5,574,650 A 11/1996 Diesel
(Continued)

FOREIGN PATENT DOCUMENTS

DE 298 05 900 U1 8/1999
DE 10 2005 025 142 A1 1/2006
(Continued)

OTHER PUBLICATIONS

Japanese Office Action issued in Application No. 2007-136634; Dated Jul. 13, 2010 (With Translation).
(Continued)

*Primary Examiner* — Redhwan k Mawari
(74) *Attorney, Agent, or Firm* — Oliff PLC

(57) ABSTRACT

A power supply device for a vehicle that is chargeable from an external power supply provided external to the vehicle, including a main battery and a battery pack that is attachable to and detachable from the vehicle. The battery pack includes a sub battery for driving electric loads common to the main battery and the sub battery, and a connector provided with a first storage unit storing information related to the sub battery. The power supply device for the vehicle further includes a control device performing control related to the main battery, and reading the information from the first storage unit and performing control related to the sub battery.

2 Claims, 9 Drawing Sheets

(51) Int. Cl.

| | |
|---|---|
| *B60K 6/365* | (2007.10) |
| *B60K 6/445* | (2007.10) |
| *B60L 3/00* | (2006.01) |
| *B60L 11/18* | (2006.01) |
| *B60W 10/26* | (2006.01) |
| *B60L 3/04* | (2006.01) |
| *B60L 3/12* | (2006.01) |
| *B60L 11/12* | (2006.01) |
| *B60L 11/14* | (2006.01) |
| *B60K 1/04* | (2006.01) |
| *B60W 20/00* | (2016.01) |

(52) U.S. Cl.
CPC .............. *B60L 3/0053* (2013.01); *B60L 3/04* (2013.01); *B60L 3/12* (2013.01); *B60L 11/123* (2013.01); *B60L 11/14* (2013.01); *B60L 11/1812* (2013.01); *B60L 11/1818* (2013.01); *B60L 11/1846* (2013.01); *B60L 11/1848* (2013.01); *B60L 11/1853* (2013.01); *B60L 11/1857* (2013.01); *B60L 11/1864* (2013.01); *B60L 11/1868* (2013.01); *B60L 11/1874* (2013.01); *B60L 11/1879* (2013.01); *B60W 10/26* (2013.01); *B60K 2001/0455* (2013.01); *B60L 2210/12* (2013.01); *B60L 2210/14* (2013.01); *B60L 2210/30* (2013.01); *B60L 2210/40* (2013.01); *B60L 2240/545* (2013.01); *B60L 2240/547* (2013.01); *B60L 2240/549* (2013.01); *B60L 2250/12* (2013.01); *B60W 20/00* (2013.01); *B60W 2510/244* (2013.01); *B60W 2540/04* (2013.01); *Y02T 10/6217* (2013.01); *Y02T 10/6239* (2013.01); *Y02T 10/6269* (2013.01); *Y02T 10/7005* (2013.01); *Y02T 10/7061* (2013.01); *Y02T 10/7066* (2013.01); *Y02T 10/7072* (2013.01); *Y02T 10/7077* (2013.01); *Y02T 10/7225* (2013.01); *Y02T 10/7233* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y02T 90/34* (2013.01); *Y04S 30/14* (2013.01)

(58) Field of Classification Search
USPC ........................................................ 701/501
See application file for complete search history.

(56) References Cited

U.S. PATENT DOCUMENTS

| | | | |
|---|---|---|---|
| 5,596,258 A * | 1/1997 | Kimura ................ | B60L 3/0084 320/109 |
| 5,664,635 A | 9/1997 | Koga et al. | |
| 5,724,265 A | 3/1998 | Hutchings | |
| 5,789,671 A | 8/1998 | Fernandez | |
| 5,899,963 A | 5/1999 | Hutchings | |
| 5,937,664 A | 8/1999 | Matsuno et al. | |
| 5,956,660 A | 9/1999 | Neumann | |
| 6,122,960 A | 9/2000 | Hutchings | |
| 6,285,954 B1 | 9/2001 | Mark et al. | |
| 6,292,751 B1 | 9/2001 | Frank | |
| 6,301,964 B1 | 10/2001 | Fyfe et al. | |
| 6,305,221 B1 | 10/2001 | Hutchings | |
| 6,522,266 B1 | 2/2003 | Soehren et al. | |
| 6,549,845 B2 | 4/2003 | Eakle, Jr. | |
| 6,563,318 B2 | 5/2003 | Kawakami et al. | |
| 6,594,617 B2 | 7/2003 | Scherzinger | |
| 6,614,352 B2 | 9/2003 | Pellet et al. | |
| 6,700,352 B1 * | 3/2004 | Elliott ................ | H02J 7/0003 320/130 |
| 6,721,657 B2 | 4/2004 | Ford et al. | |
| 6,826,477 B2 | 11/2004 | Ladetto et al. | |
| 6,912,475 B2 | 6/2005 | Moriya et al. | |
| 7,043,364 B2 | 5/2006 | Scherzinger | |
| 7,103,471 B2 | 9/2006 | Levi et al. | |
| 7,193,559 B2 | 3/2007 | Ford et al. | |
| 7,280,916 B2 | 10/2007 | Bang et al. | |
| 7,299,034 B2 | 11/2007 | Kates | |
| 7,398,844 B2 | 7/2008 | Ishikawa et al. | |
| 2002/0109506 A1 | 8/2002 | Kawakami et al. | |
| 2003/0015995 A1 | 1/2003 | Tamura et al. | |
| 2003/0231006 A1* | 12/2003 | Tojima ............... | G01R 31/3679 320/132 |
| 2004/0189226 A1 | 9/2004 | King | |
| 2004/0201362 A1* | 10/2004 | Borrego Bel ......... | H02J 7/1423 320/104 |
| 2004/0251858 A1 | 12/2004 | Asao et al. | |
| 2005/0065728 A1 | 3/2005 | Yang et al. | |
| 2005/0269994 A1 | 12/2005 | Ishishita | |
| 2006/0119316 A1 | 6/2006 | Sasaki et al. | |
| 2007/0024496 A1 | 2/2007 | Wright et al. | |
| 2007/0029986 A1 | 2/2007 | Nakamura et al. | |
| 2007/0150195 A1 | 6/2007 | Koskan et al. | |
| 2007/0156337 A1 | 7/2007 | Yanni | |
| 2007/0158118 A1 | 7/2007 | King | |
| 2007/0260418 A1 | 11/2007 | Ladetto et al. | |

FOREIGN PATENT DOCUMENTS

| | | |
|---|---|---|
| EP | 0 902 521 A2 | 3/1999 |
| EP | 0 921 607 A2 | 6/1999 |
| JP | A-06-276609 | 9/1994 |
| JP | A-06-343203 | 12/1994 |
| JP | A-07-065864 | 3/1995 |
| JP | A-07-303334 | 11/1995 |
| JP | A-08-037703 | 2/1996 |
| JP | A-08-154307 | 6/1996 |
| JP | A-09-098518 | 4/1997 |
| JP | A-09-204938 | 8/1997 |
| JP | A-10-306722 | 11/1998 |
| JP | A-11-150809 | 6/1999 |
| JP | A-2000-152422 | 5/2000 |
| JP | A-2000-253588 | 9/2000 |
| JP | A-2001-057711 | 2/2001 |
| JP | A-2001-264106 | 9/2001 |
| JP | A-2004-120936 | 4/2004 |
| JP | A-2004-262357 | 9/2004 |
| JP | A-2004-291891 | 10/2004 |
| JP | A-2004-306726 | 11/2004 |
| JP | A-2005-019231 | 1/2005 |
| JP | A-2005-160132 | 6/2005 |
| JP | A-2006-006077 | 1/2006 |
| JP | A-2006-117096 | 5/2006 |
| JP | A-2006-185863 | 7/2006 |

OTHER PUBLICATIONS

Questioning for corresponding Japanese Patent Application No. 2007-136634, mailed on Mar. 1, 2011 (w/ English translation).
Japanese Office Action issued in Application No. 2007-136634; Dated Jun. 21, 2011 (With Translation).
Jan. 31, 2012 Office Action issued in German Application No. 11 2008 001 341.1 (with translation).
Apr. 17, 2013 Notice of Allowance and Fee(s) due issued in U.S. Appl. No. 12/450,801.
Dan Simon; Optimal State Estimation, Kalman, H and Nonlinear Approaches; 2006; pp. 271-300; Wiley-Interscience; Hoboken, NJ.
Robert M. Rogers; Applied Mathematics in Integrated Navigation Systems; pp. 71-94; AIAA Education Series; Reston, Virginia.
Johann Borenstein; http://www-personal.umich.edu/~johannb/; University of Michigan.
Eric Foxlin—Intersense Inc.; NavShoe Pedestrian Inertial Navigation Technology Brief; Aug. 8, 2006/ http://www.ece.wpi.edu/Research/PPL/Workshops/2006/PDF/Intersense.pdf.
P. Grooves, G. Pulford, C. Littlefield, D. Nash and C. Mather; Inertial Navigation Versus Pedestrian Dead Reckoning: Optimizing

(56) References Cited

OTHER PUBLICATIONS the Integration; Proc ION GNSS 20$^{th}$ International Technical Meeting of the Satellite Division; Sep. 2007; Forth Worth, TX.
Acceleron Technologies; http://www.g-trax.com.
Erik Lithopoulos, Louis Lalumiere, and Ron Beyeler—Applanix Corp.; Aided-inertial for Long-term, Self-contained GPS-denied Navigation and Mapping; http://www.ece.wpi.edu/Research/PPL/Workshops/2007/PDF/Lithopoulos.pdf.
ZUPT, LLC; http://www.zput.com.
Point Research/Honeywell; http://www.pointresearch.com/magnetic/deadreckoning.html.
Mercury Data Systems, http://www.mercdatasys.com/government/.
Quentin Ladetto, http://quentin.ladetto.ch/publications.php.

* cited by examiner

OFF STATE

ON STATE

ON-VEHICLE EQUIPMENT CONTROL SYSTEM AND VEHICLE

This is a Division of application Ser. No. 12/450,801 filed Oct. 14, 2009, which in turn is a National Phase of Application No. PCT/JP2008/058442 filed Apr. 24, 2008. The disclosure of the prior applications is hereby incorporated by reference herein in its entirety.

TECHNICAL FIELD

The present invention relates to an on-vehicle equipment control system and a vehicle, and in particular, to an on-vehicle equipment control system for a vehicle that is externally chargeable and the vehicle.

BACKGROUND ART

In recent years, vehicles equipped with a power supply device and using its electric power to drive a motor, such as electric cars, hybrid cars, fuel cell cars, and the like, have been attracting attention as environmentally-friendly cars.

In such a vehicle, employing an externally chargeable configuration has also been under consideration. Japanese Patent Laying-Open No. 8-154307 discloses a hybrid electric car including a battery that is chargeable by external charging means, a drive motor that can drive wheels using electric power from the battery, control means controlling operation of the motor, and an internal combustion engine directly or indirectly used to drive the wheels.

To extend travel distance that can be achieved by charged electric power, it is necessary to increase the capacity of a power storage device. However, increasing the capacity of a power storage device results in an increase in cost and an increase in the weight of a vehicle, leading to bad mileage. Therefore, it is desirable to match the capacity of a battery to a usage pattern of a purchasing user.

Specifically, since travel distance per charge is not necessarily the same for each user of externally chargeable hybrid vehicles, there arises a desire to change the capacity of a mounted battery for each purchasing user. For example, it is conceivable to select optimal battery capacity based on the distance between a home and an office of the user.

However, preparing vehicles with various battery capacities results in an increase in manufacturing cost and difficult manufacturing management. Further, it is more preferable that the capacity of a battery owned by a user can be changed when there is a change in the user's usage environment because of a move, job transfer, or the like.

Disclosure of the Invention

One object of the present invention is to provide an on-vehicle equipment control system and a vehicle capable of easily changing battery capacity.

In summary, the present invention is an on-vehicle equipment control system, including: a battery pack configured to be attachable to and detachable from a vehicle and including a storage unit storing information; and a control device controlling on-vehicle equipment based on the information stored in the storage unit when the battery pack is connected to the vehicle, and controlling the on-vehicle equipment based on information other than the information stored in the storage unit when the battery pack is not connected to the vehicle.

Preferably, the control device controls charge and discharge of the battery pack based on the information stored in the storage unit.

Preferably, the on-vehicle equipment control system further includes a cooling device cooling the battery pack. The control device controls the cooling device based on the information stored in the storage unit.

Preferably, the on-vehicle equipment control system further includes a first battery supplying electric power to the on-vehicle equipment. The battery pack further includes a second battery supplying electric power to the on-vehicle equipment. The control device causes the on-vehicle equipment to perform control related to the first battery and control related to the second battery based on the information stored in the storage unit.

More preferably, the control device performs processing related to the first battery and the second battery based on a prescribed control constant, and changes the control constant based on the information read from the storage unit.

Preferably, the control device determines whether or not the battery pack is an authorized product based on the information read from the storage unit.

Preferably, the battery pack further includes a battery supplying electric power to the on-vehicle equipment, and a cooling device cooling the battery.

According to another aspect, the present invention is an on-vehicle equipment control system, including: a battery pack having a connection unit for attachably and detachably connecting to a vehicle; a shape detection unit provided to the vehicle for detecting a shape of the connection unit; and a control device controlling on-vehicle equipment based on a detection result of the shape detection unit.

Preferably, the control device controls charge and discharge of the battery pack based on the detection result of the shape detection unit.

Preferably, the on-vehicle equipment control system further includes a cooling device cooling the battery pack. The control device controls the cooling device based on the detection result of the shape detection unit.

Preferably, the on-vehicle equipment control system further includes a first battery supplying electric power to the on-vehicle equipment. The battery pack further includes a second battery supplying electric power to the on-vehicle equipment. The control device causes the on-vehicle equipment to perform control related to the first battery and control related to the second battery based on the detection result of the shape detection unit.

More preferably, the control device performs processing related to the first battery and the second battery based on a prescribed control constant, and changes the control constant based on the detection result of the shape detection unit.

Preferably, the battery pack further includes a battery supplying electric power to the on-vehicle equipment, and a cooling device cooling the battery.

According to still another aspect of the present invention, provided is a vehicle configured such that a battery pack having a connection unit connecting to the vehicle is attachable and detachable from the vehicle, including a control device controlling on-vehicle equipment based on information read from the battery pack when the battery pack is connected to the vehicle, and controlling the on-vehicle equipment based on information stored in the vehicle when the battery pack is not connected to the vehicle.

Preferably, the control device controls charge and discharge of the battery pack based on the information read from the battery pack.

Preferably, the vehicle further includes a cooling device cooling the battery pack. The control device controls the cooling device based on the information read from the battery pack.

Preferably, the vehicle further includes a first battery supplying electric power to the on-vehicle equipment. The battery pack further includes a second battery supplying electric power to the on-vehicle equipment. The control device causes the on-vehicle equipment to perform control related to the first battery and control related to the second battery based on the information read from the battery pack.

More preferably, the control device performs processing related to the first battery and the second battery based on a prescribed control constant, and changes the control constant based on the information read from the battery pack.

Preferably, the control device determines whether or not the battery pack is an authorized product based on the information read from the battery pack.

Preferably, the battery pack further includes a battery supplying electric power to the on-vehicle equipment, and a cooling device cooling the battery.

According to still another aspect of the present invention, provided is a vehicle configured such that a battery pack having a connection unit connecting to the vehicle is attachable and detachable from the vehicle, including: a shape detection unit provided to the vehicle for detecting a shape of the connection unit; and a control device controlling on-vehicle equipment based on a detection result of the shape detection unit.

Preferably, the control device controls charge and discharge of the battery pack based on the detection result of the shape detection unit.

Preferably, the vehicle further includes a cooling device cooling the battery pack. The control device controls the cooling device based on the detection result of the shape detection unit.

Preferably, the vehicle further includes a first battery supplying electric power to the on-vehicle equipment. The battery pack further includes a second battery supplying electric power to the on-vehicle equipment. The control device causes the on-vehicle equipment to perform control related to the first battery and control related to the second battery based on the detection result the shape detection unit.

More preferably, the control device performs processing related to the first battery and the second battery based on a prescribed control constant, and changes the control constant based on the detection result of the shape detection unit.

Preferably, the battery pack further includes a battery supplying electric power to the on-vehicle equipment, and a cooling device cooling the battery.

According to the present invention, battery capacity of a power supply device for a vehicle can be easily changed. Further, optimal battery capacity can be determined for each user.

BEST MODES FOR CARRYING OUT THE INVENTION

Figure 1:
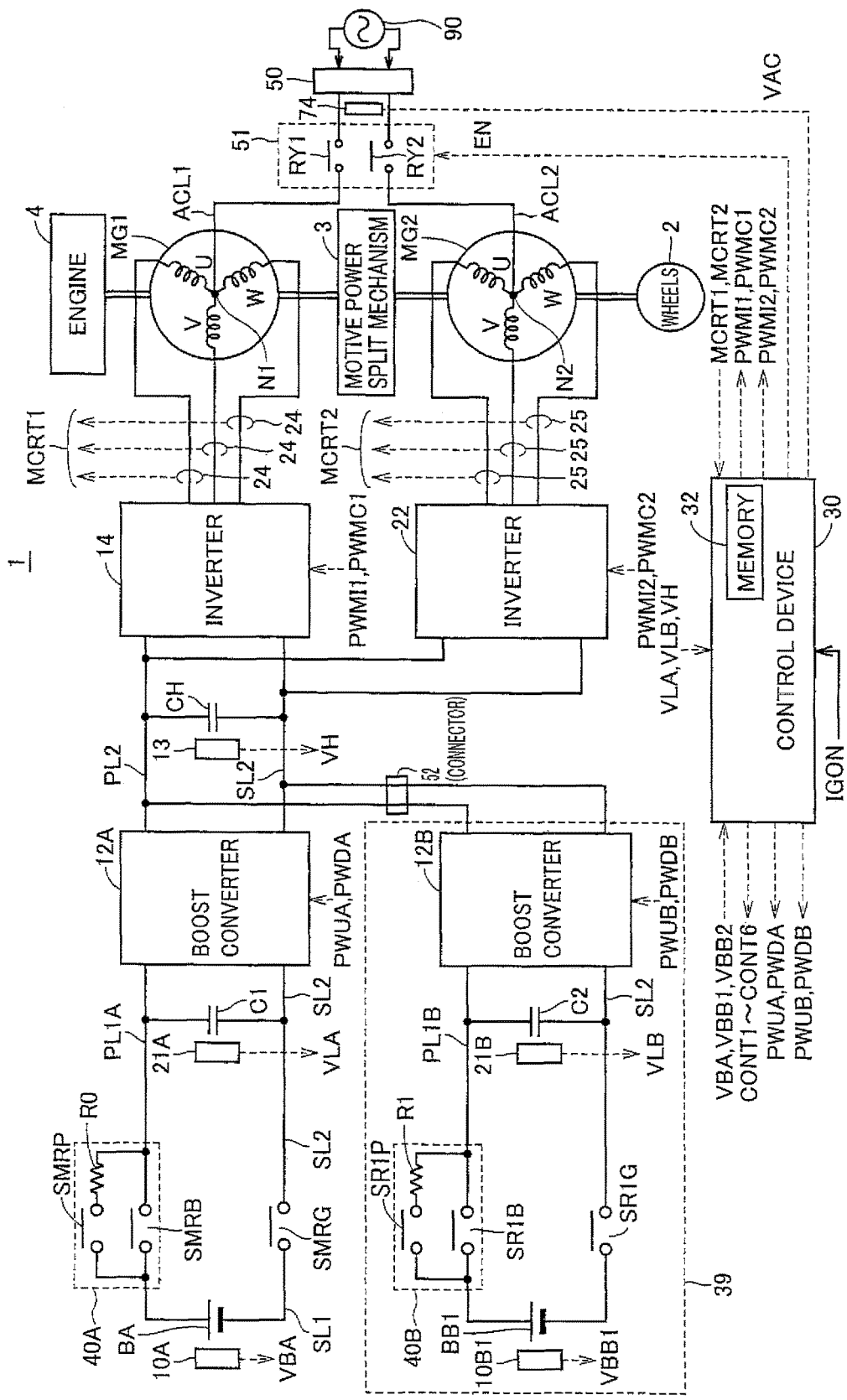
FIG. 1 shows a main configuration of a vehicle 1 in accordance with an embodiment of the present invention.

Embodiments of the present invention will now be described in detail with reference to the drawings, in which identical or corresponding parts will be designated by the same reference numerals, and the description thereof will not be repeated.

[Overall Configuration of Vehicle]

FIG. 1 shows a main configuration of a vehicle 1 in accordance with an embodiment of the present invention.

Referring to FIG. 1, vehicle 1 includes a main battery BA serving as a power storage device, a boost converter 12A, a smoothing capacitor C1, and a voltage sensor 21A.

Vehicle 1 further includes a smoothing capacitor CH, voltage sensors 10A, 10B1, and 13, inverters 14 and 22, an engine 4, motor generators MG1 and MG2, a motive power split mechanism 3, wheels 2, and a control device 30.

Vehicle 1 further includes a connector 52, and a battery pack 39 attachably and detachably connected to vehicle 1 by connector 52. Total capacity of batteries mounted on vehicle 1 can be adjusted by mounting battery pack 39 on vehicle 1 or removing battery pack 39 from vehicle 1.

Battery pack 39 includes a sub battery BB1, a boost converter 12B, a smoothing capacitor C2, and voltage sensors 10B1 and 21B.

A power storage device mounted on this vehicle is externally chargeable. For this end, vehicle 1 further includes electric power input lines ACL1 and ACL2, a relay circuit 51, an input terminal 50, and a voltage sensor 74.

Relay circuit 51 includes relays RY1 and RY2. As relays RY1 and RY2, for example, mechanical contact relays can be used, and semiconductor relays may also be used. Electric power input line ACL1 has one end connected to one end of relay RY1, and the other end connected to a neutral point N1 of a three-phase coil of motor generator MG1. Electric power input line ACL2 has one end connected to one end of relay RY2, and the other end connected to a neutral point N2 of a three-phase coil of motor generator MG2. Further, input terminal 50 is connected to the other ends of relays RY1 and RY2.

When an input enable signal EN from control device 30 is activated, relay circuit 51 electrically connects input terminal 50 with electric power input lines ACL1 and ACL2. Specifically, when input enable signal EN is activated, relay circuit 51 turns on relays RY1 and RY2, and when input enable signal EN is deactivated, relay circuit 51 turns off relays RY1 and RY2.

Input terminal 50 is a terminal for connecting a commercial external power supply 90 to hybrid vehicle 1. In hybrid vehicle 1, battery BA or BB1 can be charged from external power supply 90 connected to input terminal 50.

It is to be noted that the configuration described above utilizes neutral points of stator coils of two rotating electric machines, and instead of such a configuration, for example, a battery charging device mounted on a vehicle or external to a vehicle may be used for connection with a commercial AC 100 V power supply, or a technique of causing boost converters 12A and 12B together to serve as an alternating current (AC) to direct current (DC) conversion device may be used when optional battery pack 39 is mounted.

Smoothing capacitor C1 is connected between a power supply line PL1A and a ground line SL2. Voltage sensor 21A detects a voltage VLA across smoothing capacitor C1, and outputs voltage VLA to control device 30. Boost converter 12A boosts the voltage across terminals of smoothing capacitor C1.

Smoothing capacitor C2 is connected between a power supply line PL1B and ground line SL2. Voltage sensor 21B detects a voltage VLB across smoothing capacitor C2, and outputs voltage VLB to control device 30. Boost converter 12B boosts the voltage across terminals of smoothing capacitor C2.

Smoothing capacitor CH smoothes the voltages boosted by boost converters 12A and 12B. Voltage sensor 13 detects a voltage VH across terminals of smoothing capacitor CH, and outputs voltage VH to control device 30.

Inverter 14 converts a DC voltage supplied from boost converter 12B or 12A into a three-phase AC voltage, and outputs the three-phase AC voltage to motor generator MG1. Inverter 22 converts a DC voltage supplied from boost converter 12B or 12A into a three-phase AC voltage, and outputs the three-phase AC voltage to motor generator MG2.

Motive power split mechanism 3 is a mechanism coupled to engine 4 and motor generators MG1 and MG2 to split motive power therebetween. For example, a planetary gear mechanism having three rotation axes of a sun gear, a planetary carrier, and a ring gear can be used as the motive power split mechanism. When rotations of two of the three rotation axes are determined in the planetary gear mechanism, rotation of the other one rotation axis is inevitably determined. These three rotation axes are connected to rotation axes of engine 4, motor generator MG1, and motor generator MG2, respectively. The rotation axis of motor generator MG2 is coupled to wheels 2 by a reduction gear and a differential gear not shown. A decelerator for the rotation axis of motor generator MG2 may be further incorporated or an automatic transmission may be incorporated into motive power split mechanism 3.

In relation to main battery BA, vehicle 1 further includes a connection unit 40A provided on a positive electrode side, and a system main relay SMRG serving as a connection unit provided on a negative electrode side. Connection unit 40A includes a system main relay SMRB connected between a positive electrode of main battery BA and power supply line PL1A, and a system main relay SMRP and a limiting resistor R0 connected in series with each other and connected in parallel with system main relay SMRB. System main relay SMRG is connected between a negative electrode of main battery BA (a ground line SL1) and ground line SL2.

Conductive/nonconductive states of system main relays SMRP, SMRB, and SMRG are controlled by control signals CONT1 to CONT3 supplied from control device 30, respectively.

Voltage sensor 10A measures a voltage VA across terminals of main battery BA. Although not shown, a current sensor sensing a current flowing into main battery BA is provided to monitor the state of charge of main battery BA together with voltage sensor 10A. As main battery BA, for example, a secondary battery such as a lead-acid battery, a nickel hydride battery, or a lithium ion battery, or a large-capacity capacitor such as an electric double layer capacitor can be used.

Battery pack 39 includes a connection unit 40B provided on a positive electrode side, and a system main relay SR1G serving as a connection unit provided on a negative electrode side. Connection unit 40B includes a system main relay SR1B connected between a positive electrode of sub battery BB1 and power supply line PL1B, and a system main relay SR1P and a limiting resistor R1 connected in series with each other and connected in parallel with system main relay SR1B. System main relay SR1G is connected between a negative electrode of sub battery BB1 and ground line SL2.

Conductive/nonconductive states of system main relays SR1P, SR1B, and SR1G are controlled by control signals CONT4 to CONTE supplied from control device 30, respectively.

Ground line SL2 extends through boost converters 12A and 12B to inverters 14 and 22, as described below.

Voltage sensor 10B1 measures a voltage VBB1 across terminals of sub battery BB1. Although not shown, a current sensor sensing a current flowing into each battery is provided to monitor the state of charge of sub battery BB1 together with voltage sensor 10B1. As sub battery BB1, for example, a secondary battery such as a lead-acid battery, a nickel hydride battery, or a lithium ion battery, or a large-capacity capacitor such as an electric double layer capacitor can be used.

It is to be noted that sub battery BB1 is an optional battery added or removed according to a user's usage status, whereas main battery BA is a base battery mounted on the vehicle as a minimum necessary battery.

Inverter 14 is connected to a power supply line PL2 and ground line SL2. Inverter 14 receives the boosted voltages from boost converters 12A and 12B, and drives motor generator MG1 to, for example, start engine 4. Inverter 14 also returns electric power generated in motor generator MGT by motive power transmitted from engine 4, to boost converters 12A and 12B. On this occasion, boost converters 12A and 12B are controlled by control device 30 to operate as step-down circuits.

A current sensor 24 detects a current flowing into motor generator MG1 as a motor current value MCRT1, and outputs motor current value MCRT1 to control device 30.

Inverter 22 is connected to power supply line PL2 and ground line SL2 in parallel with inverter 14. Inverter 22 converts the DC voltages output from boost converters 12A and 12B into three-phase AC voltages, and outputs the three-phase AC voltages to motor generator MG2 driving wheels 2. Inverter 22 also returns electric power generated in motor generator MG2 by regenerative braking, to boost converters 12A and 12B. On this occasion, boost converters 12A and 12B are controlled by control device 30 to operate as step-down circuits.

A current sensor 25 detects a current flowing into motor generator MG2 as a motor current value MCRT2, and outputs motor current value MCRT2 to control device 30.

Control device 30 receives torque command values and rotation speeds of motor generators MG1 and MG2, values of voltages VBA, VBB1, VBB2, VLA, VLB, and VH, motor current values MCRT1 and MCRT2, and an activation signal IGON. Then, control device 30 outputs to boost converter 12B a control signal PWUB giving an instruction to boost a voltage, a control signal PWDB giving an instruction to step down a voltage, and a shut-down signal giving an instruction to prohibit operation.

Further, control device 30 outputs to inverter 14 a control signal PWMI1 giving a drive instruction to convert the DC voltages output from boost converters 12A and 12B into AC voltages for driving motor generator MG1, and a control signal PWMC1 giving a regenerative instruction to convert an AC voltage generated in motor generator MG1 into a DC voltage and return the DC voltage to boost converters 12A and 12B.

Similarly, control device 30 outputs to inverter 22 a control signal PWMI2 giving a drive instruction to convert the DC voltages into AC voltages for driving motor generator MG2, and a control signal PWMC2 giving a regenerative instruction to convert an AC voltage generated in motor generator MG2 into a DC voltage and return the DC voltage to boost converters 12A and 12B.

Control device 30 includes a memory 32 storing various maps for controlling inverters 14 and 22 and boost converters 12A and 12B, and the like.

Figure 2:
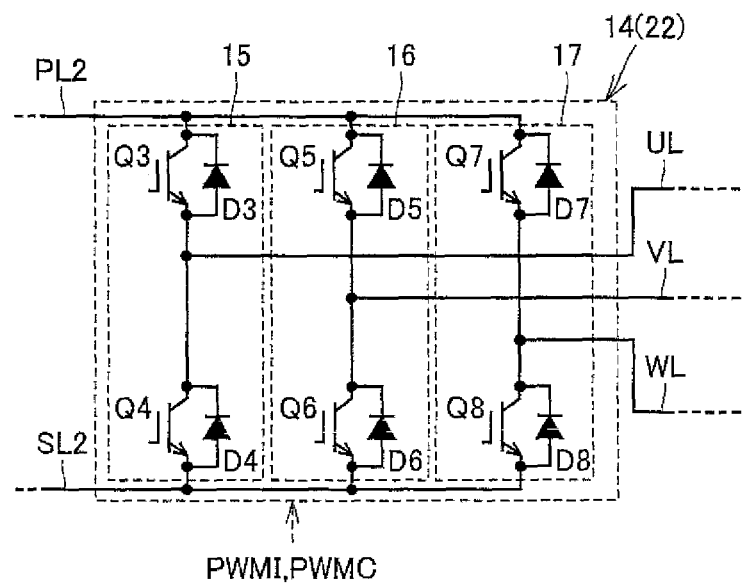
FIG. 2 is a circuit diagram showing a detailed configuration of inverters 14 and 22 of FIG. 1.

FIG. 2 is a circuit diagram showing a detailed configuration of inverters 14 and 22 of FIG. 1.

Referring to FIGS. 1 and 2, inverter 14 includes a U-phase arm 15, a V-phase arm 16, and a W-phase arm 17. U-phase arm 15, V-phase arm 16, and W-phase arm 17 are connected in parallel between power supply line PL2 and ground line SL2.

U-phase arm 15 includes IGBT (Insulated Gate Bipolar Transistor) elements Q3 and Q4 connected in series between power supply line PL2 and ground line SL2, and diodes D3 and D4 connected in parallel with IGBT elements Q3 and Q4, respectively. A cathode of diode D3 is connected with a collector of IGBT element Q3, and an anode of diode D3 is connected with an emitter of IGBT element Q3. A cathode of diode D4 is connected with a collector of IGBT element Q4, and an anode of diode D4 is connected with an emitter of IGBT element Q4.

V-phase arm 16 includes IGBT elements Q5 and Q6 connected in series between power supply line PL2 and ground line SL2, and diodes D5 and D6 connected in parallel with IGBT elements Q5 and Q6, respectively. A cathode of diode D5 is connected with a collector of IGBT element Q5, and an anode of diode D5 is connected with an emitter of IGBT element Q5. A cathode of diode D6 is connected with a collector of IGBT element Q6, and an anode of diode D6 is connected with an emitter of IGBT element Q6.

W-phase arm 17 includes IGBT elements Q7 and Q8 connected in series between power supply line PL2 and ground line SL2, and diodes D7 and D8 connected in parallel with IGBT elements Q7 and Q8, respectively. A cathode of diode D7 is connected with a collector of IGBT element Q7, and an anode of diode D7 is connected with an emitter of IGBT element Q7. A cathode of diode D8 is connected with a collector of IGBT element Q8, and an anode of diode D8 is connected with an emitter of IGBT element Q8.

Intermediate points of the respective phase arms are connected to phase ends of respective phase coils of motor generator MG1. Specifically, motor generator MG1 is a three-phase permanent magnet synchronous motor, and one ends of three U-, V- and W-phase coils are connected together to the neutral point. The other end of the U-phase coil is connected to a line UL drawn from a connection node between IGBT elements Q3 and Q4. The other end of the V-phase coil is connected to a line VL drawn from a connection node between IGBT elements Q5 and Qb. The other end of the W-phase coil is connected to a line WL drawn from a connection node between IGBT elements Q7 and Q8.

Although inverter 22 of FIG. 1 is different from inverter 14 in that it is connected to motor generator MG2, its internal circuit configuration is the same as that of inverter 14, and thus the detailed description thereof will not be repeated. Further, although FIG. 2 shows that control signals PWMI and PWMC are supplied to the inverter, this illustration is given so as not to make the description complicated, and, as shown in FIG. 1, control signals PWMI1 and PWMC1 are supplied to inverter 14, and control signals PWMI2 and PWMC2 are supplied to inverter 22.

Figure 3:
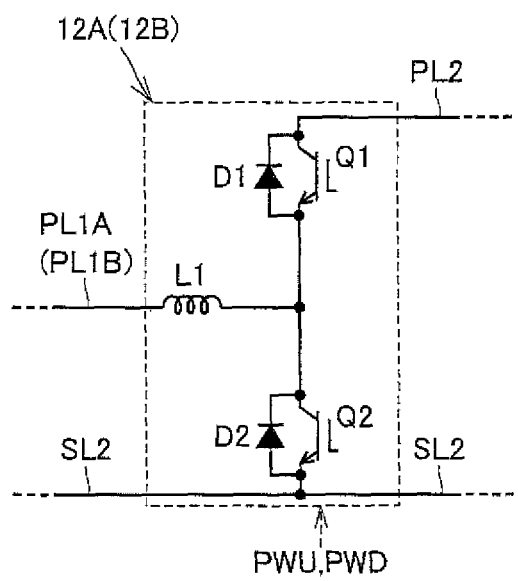
FIG. 3 is a circuit diagram showing a detailed configuration of boost converters 12A and 12B of FIG. 1.

FIG. 3 is a circuit diagram showing a detailed configuration of boost converters 12A and 12B of FIG. 1.

Referring to FIGS. 1 and 3, boost converter 12A includes a reactor L1 having one end connected to power supply line PL1A, IGBT elements Q1 and Q2 connected in series between power supply line PL2 and ground line SL2, and diodes D1 and D2 connected in parallel with IGBT elements Q1 and Q2, respectively.

The other end of reactor L1 is connected to an emitter of IGBT element Q1 and a collector of IGBT element Q2. A cathode of diode D1 is connected with a collector of IGBT element Q1, and an anode of diode D1 is connected with the emitter of IGBT element Q1. A cathode of diode D2 is connected with the collector of IGBT element Q2, and an anode of diode D2 is connected with an emitter of IGBT element Q2.

Although boost converter 12B of FIG. 1 is different from boost converter 12A in that it is connected to power supply line PL1B instead of power supply line PL1A, its internal circuit configuration is the same as that of boost converter 12A, and thus the detailed description thereof will not be repeated. Further, although FIG. 3 shows that control signals PWU and PWD are supplied to the boost converter, this illustration is given so as not to make the description complicated, and, as shown in FIG. 1, control signals PWUA and PWDA are supplied to inverter 14, and control signals PWUB and PWDB are supplied to inverter 22.

[Power Supply Device Capable of being Equipped with Sub Battery]

Referring to FIG. 1 again, a power supply device for a vehicle in an embodiment of the present application is a power supply device for a vehicle that is chargeable from external power supply 90 provided external to vehicle 1, including main battery BA and battery pack 39 that is attachable to and detachable from the vehicle. Battery pack 39 includes sub battery BB1 for driving electric loads (inverters 14 and 22) common to main battery BA and sub battery BB1, and connector 52 provided with a projection (pin) having a shape corresponding to information related to sub battery BB1. The power supply device for the vehicle further includes control device 30 performing control related to main battery BA, and detecting information from the shape of the connector and performing control related to sub battery BB1.

The information detected from the shape of the connector includes, for example, the capacity of sub battery BB1. When there is a change in the capacity of the sub battery, control device 30 can perform appropriate control according to the change. It is to be noted that the power storage capacity of the main battery is not necessarily greater than that of the sub battery. A sub battery having a capacity greater than that of the main battery may be connected. Further, the sub battery may be used preferentially to the main battery.

Preferably, the power supply device for the vehicle further includes connector 52 for connecting battery pack 39. Battery pack 39 further includes boost converter 12B serving as a voltage conversion circuit converting a power supply voltage of sub battery BB1 based on a control signal supplied from control device 30 via the connector.

By incorporating boost converter 12B into battery pack 39, independent charge/discharge control can be performed on main battery BA and sub battery BB1 even when they have different voltages.

As a method for matching the voltages, the voltage of sub battery BB1 may be matched to the voltage of main battery BA by boost converter 12B, or conversely, the voltage of main battery BA may be matched to the voltage of sub battery BB1 by boost converter 12A.

Further, boost converter 12A may be eliminated, and the voltage of sub battery BB1 may be matched to the voltage of main battery BA by boost converter 12B. In this case, the number of cells may be set and charge/discharge management may be performed such that the power supply voltage of sub battery BB1 is lower than a power supply voltage of main battery BA. Conversely, boost converter 12B may be eliminated, and the voltage of main battery BA may be matched to the voltage of sub battery BB1 by boost converter 12A. In this case, the number of cells may be set and charge/discharge management may be performed such that the power supply voltage of main battery BA is lower than the power supply voltage of sub battery BB1.

Preferably, the power supply device for the vehicle further includes a charging device for charging main battery BA and sub battery BB1 by external power supply 90. The charging device is configured of inverters 14 and 22 and the stator coils of motor generators MG1 and MG2.

First Embodiment

Figure 4:
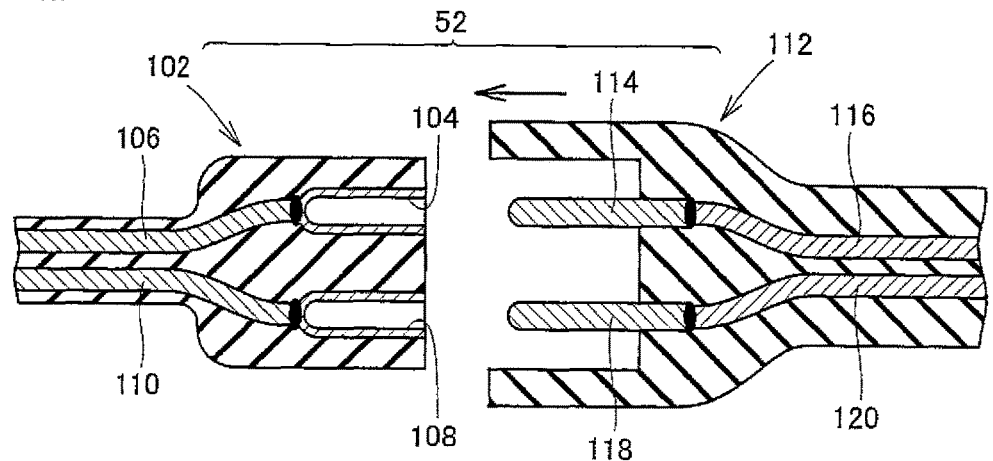
FIG. 4 shows a structure of a connector provided between a vehicle and a battery pack used in a first embodiment.

FIG. 4 shows a structure of a connector provided between a vehicle and a battery pack used in a first embodiment.

Referring to FIG. 4, connector 52 is a combination of a connector member 102 connected to a vehicle side (inverter side) and a connector member 112 connected to a battery pack side.

Connector member 112 includes power cables 116 and 120 connected to the battery, plug pieces 114 and 118 connected to power cables 116 and 120, respectively, and an insulating cover. Plug piece 114 is a positive terminal, and plug piece 118 is a negative terminal.

Connector member 102 includes power cables 106 and 110 connected to the inverters of the vehicle, insertion fittings 104 and 108 connected to power cables 106 and 110, respectively, and an insulating cover. Plug piece 114 is inserted into insertion fitting 104, and plug piece 118 is inserted into insertion fitting 108. Since the insulating covers are provided, an operator is prevented from touching the plug piece.

Figure 5:
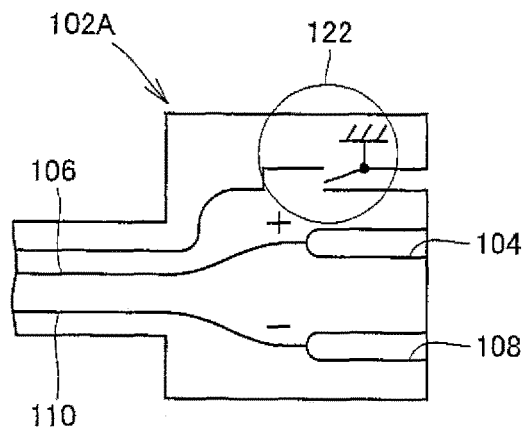
FIG. 5 shows a connector member 102A provided with a switch for determining a battery type.

FIG. 5 shows a connector member 102A provided with a switch for determining a battery type.

Figure 6:
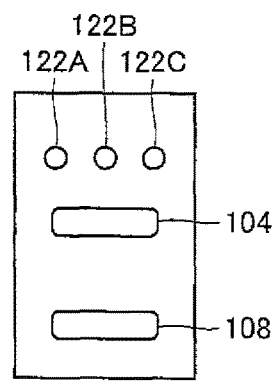
FIG. 6 is a view of connector member 102A shown in FIG. 5 as seen from a direction of a plug insertion surface.

FIG. 6 is a view of connector member 102A shown in FIG. 5 as seen from a direction of a plug insertion surface.

Referring to FIGS. 5 and 6, connector member 102A provided with a battery type determining switch 122 is shown as an example of connector member 102. Switch 122 is provided, for example, inside each of three pin insertion ports 122A, 122B, and 122C. The connector member connected to a battery side is provided with a pin at a position corresponding to a battery type. When there is a pin, switch 122 is pushed by the pin and set to an ON state. When there is no pin, switch 122 is set to an OFF state.

Figure 7:
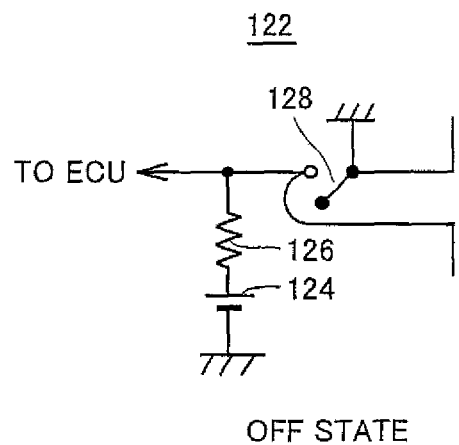
FIG. 7 shows an OFF state of a switch 122.

FIG. 7 shows an OFF state of switch 122.

Figure 8:
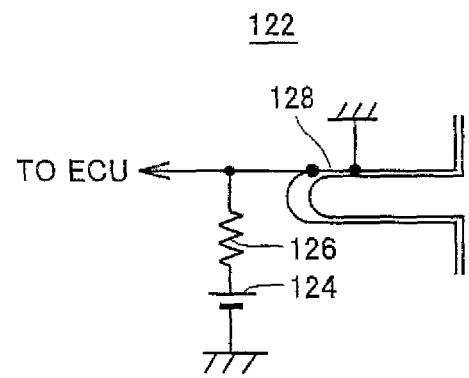
FIG. 8 shows an ON state of switch 122.

FIG. 8 shows an ON state of switch 122.

Referring to FIGS. 7 and 8, switch 122 includes a resistor 126 for coupling a line transmitting a signal to a control device such as an ECU to a positive voltage of 5 V or 14 V, and a movable piece 128. When no pin is inserted into pin insertion ports 122A, 122B, and 122C, piece 128 is opened, and thus a voltage at an H (logical high) level is supplied to the control device such as an ECU. When a pin is inserted into any of pin insertion ports 122A, 122B, and 122C, piece 128 of switch 122 inside the insertion port into which the pin is inserted is closed, and thus a signal at an L (logical low) level is transmitted to the control device.

In a case where there are three insertion ports, the cube of 2, that is, 8 states can be indicated. Therefore, by indicating the capacity of a currently connected battery pack with the position of the pin, the control device on the vehicle side can determine the capacity.

Figure 9:
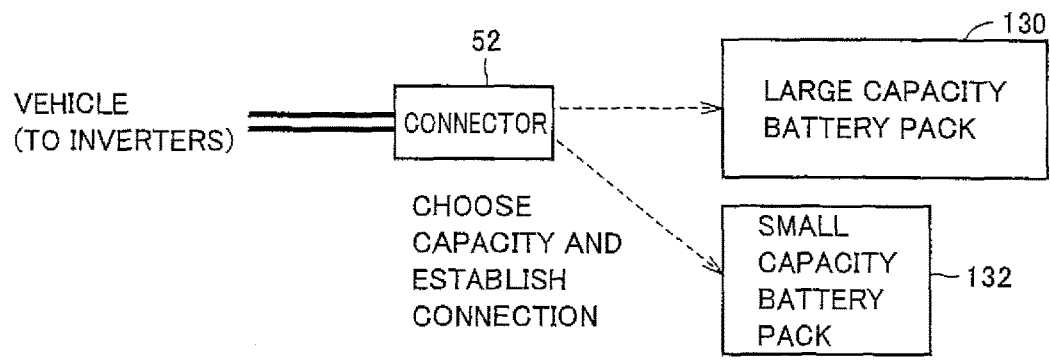
FIG. 9 is a view for illustrating battery pack types.

FIG. 9 is a view for illustrating battery pack types.

Referring to FIG. 9, a battery pack with a large capacity and a battery pack with a small capacity are prepared as options. It is necessary to choose either one of a large capacity battery pack 130 and a small capacity battery pack 132 and connect it to connector 52. Alternatively, a choice not to connect any battery pack may be made. Pins are provided to battery pack 130 and battery pack 132 at different positions. If the relation between the positions of the pins and the capacities is set beforehand, the capacity of a battery pack can be determined by observing ON/OFF of switch 122 and thereby recognizing a pin position by the control device on the vehicle side.

In the first embodiment, a shape provided to the battery-pack-side member of the connector for connecting a battery pack indicates information such as the capacity of the battery pack. Vehicle-side member 102A of the connector is provided with detection switch 122 serving as a detection unit for detecting the shape.

Figure 10:
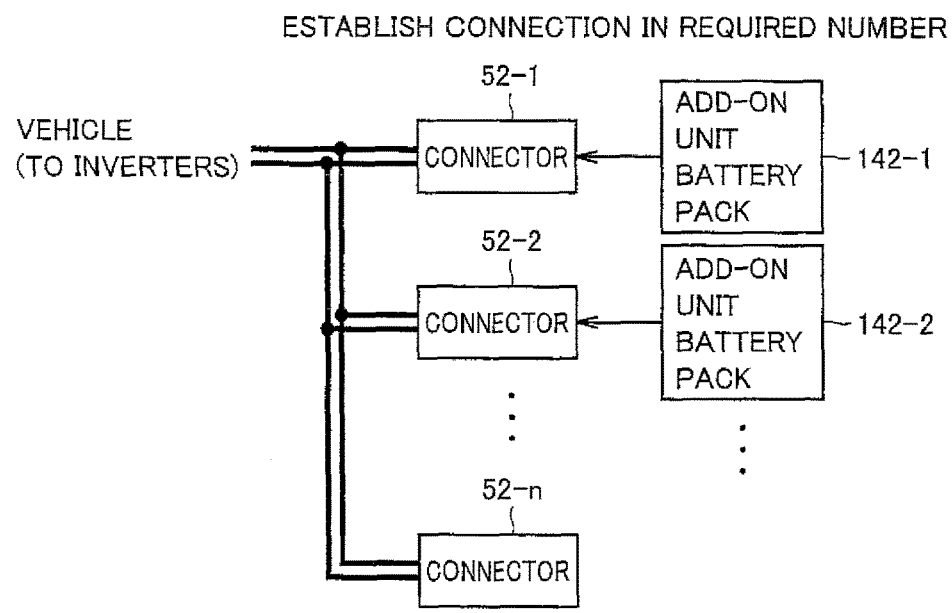
FIG. 10 shows an example of capacity increase and decrease in a case where there is one type of battery pack.

FIG. 10 shows an example of capacity increase and decrease in a case where there is one type of battery pack.

Referring to FIG. 10, a plurality of connectors 52-1 to 52-n connected to the inverters are provided on the vehicle side. Add-on unit battery packs 142-1, 142-2, . . . in a required number are connected to the connectors at a sales office or a service factory.

The control device on the vehicle side can detect the number of the connected battery packs by connection detection switches 122 provided to the connectors, and thereby can determine total battery capacity.

Figure 11:
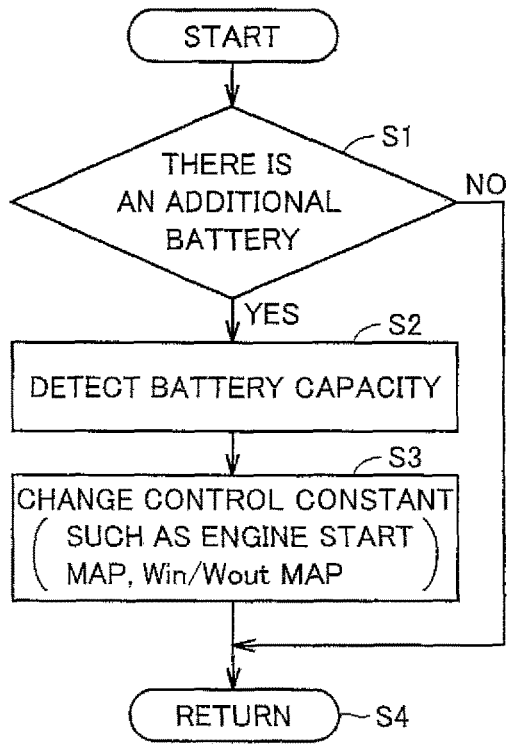
FIG. 11 is a flowchart for illustrating control associated with connection of an additional battery pack performed by a control device 30.

FIG. 11 is a flowchart for illustrating control associated with connection of an additional battery pack performed by control device 30. Processing in the flowchart is, for example, invoked from a main routine and performed when the vehicle's system is started.

Referring to FIG. 11, firstly, when the processing is started, control device 30 determines in step S1 whether or not an additional battery pack is connected. If detection switch 122 of connector 52 is in an ON state, it is determined that connection is established. If switches 122 are all in an OFF state, it is determined that no connection is established.

When it is determined in step S1 that there is no additional battery, the processing proceeds to step S4, and the control is transferred to the main routine without special change in the control. In this case, a standard map among a plurality of maps stored in memory 32 of FIG. 1 is applied as is. On the other hand, when it is determined that there is an additional battery, the processing proceeds to step S2.

In step S2, battery capacity is detected. In the technique of changing the capacity of a battery pack as illustrated in FIG. 9, the capacity can be detected by confirming into which port among pin insertion ports 122A to 122C of FIG. 6 a pin is inserted. In the technique of changing the number of battery packs as illustrated in FIG. 10, the number of connected battery packs can be determined from the number of switches 122 respectively provided to connectors 52-1 to 52-n that are in an ON state. Therefore, the battery capacity can be detected by multiplying the number by add-on unit battery capacity.

When the processing in step S2 is terminated, the processing in step S3 is then performed. In step S3, a control constant used by control device 30 for controlling a hybrid system is changed. The control constant is changed, for example, by switching the plurality of maps in memory 32 of FIG. 1 according to the battery capacity. Examples of the maps include an engine start map defining a threshold for starting the engine with respect to a required output power value, a map defining the maximum electric power Wout that can be output from the batteries or the maximum electric power Win that can be charged in the batteries, a boost control map for the boost converters, and a control map for a battery cooling device.

Figure 12:
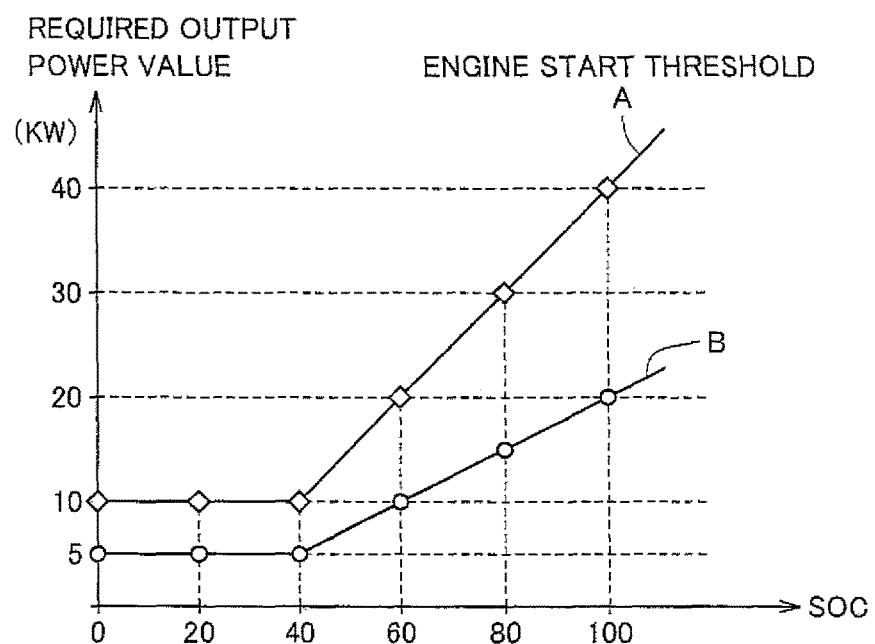
FIG. 12 is a view for illustrating switching of maps of engine start thresholds as an example of a control constant.

FIG. 12 is a view for illustrating switching of maps of engine start thresholds as an example of the control constant.

Referring to FIG. 12, a map A is a map in a case where the battery capacity is increased, and a map B is a standard map used when the battery capacity is not increased. The more the battery capacity is, the more the battery can supply electric power to a motor. Therefore, even when an accelerator pedal is pressed down and the required output power value is increased, if there is an add-on battery, required power can be output to an axle only by the motor without starting the engine.

More specifically, in a case where battery SOC (State Of Charge) is 0 to 40%, if no battery is added, the engine is started when an output power of 5 kW is required, as shown in map B. On the other hand, if a battery is added, the engine is started when an output power of 10 kW is required, as shown in map A.

In a case where the battery SOC is 60%, if no battery is added, the engine is started when an output power of 10 kW is required, as shown in map B. On the other hand, if a battery is added, the engine is started when an output power of 20 kW is required, as shown in map A.

In a case where the battery SOC is 80%, if no battery is added, the engine is started when an output power of 15 kW is required, as shown in map B. On the other hand, if a battery is added, the engine is started when an output power of 30 kW is required, as shown in map A.

In a case where the battery SOC is 100%, if no battery is added, the engine is started when an output power of 20 kW is required, as shown in map B. On the other hand, if a battery is added, the engine is started when an output power of 40 kW is required, as shown in map A. In other words, if a battery is added and the SOC is 100%, the vehicle can travel only by the motor, with the engine stopped, until when the required output power value reaches 40 kW.

As described above, an increase in battery capacity causes an increase in outputtable power, expanding a range in which the engine need not be started.

Further, since the SOC for starting the engine is also changed, the travel distance that can be achieved with the engine stopped can be extended appropriately according to addition of a battery pack. Furthermore, in the hybrid vehicle, the engine is started by rotating motor generator MG1 using electric power of the batteries, and when the number of battery packs is decreased, the SOC for starting the engine to start charging is also changed, preventing the battery from discharging excessively and disabling engine start.

It is to be noted that the maps shown in FIG. 12 are modeled and simplified, and they are actually adapted through vehicle travel experiments. Further, as to Win and Wout, maps defined for temperature or the SOC are switched according to the battery capacity.

Specifically, preferably, control device 30 performs processing related to main battery BA and sub battery BB1 based on a prescribed control constant. Then, control device 30 changes the prescribed control constant based on information read from a pin position in the connector corresponding to a storage unit storing information.

Although the first embodiment illustrates an example in which control device 30 on the vehicle side automatically reads information of a battery pack and changes the control constant according to the information, there may be a case where control device 30 does not necessarily automatically perform reading the information. For example, control device 30 may be configured such that it is provided with a write terminal to allow the control constant to be rewritten, and when a battery pack is added, removed, or exchanged, the control constant on memory 32 of control device 30 is rewritten from the write terminal.

As has been described above, in the first embodiment, on-vehicle equipment is controlled under control conditions suitable for a mounted battery pack. For example, by appropriately controlling the inverters and boost converters serving as the on-vehicle equipment, charge and discharge of the batteries including the base battery and the optional battery can be satisfactorily performed.

Second Embodiment

Figure 13:
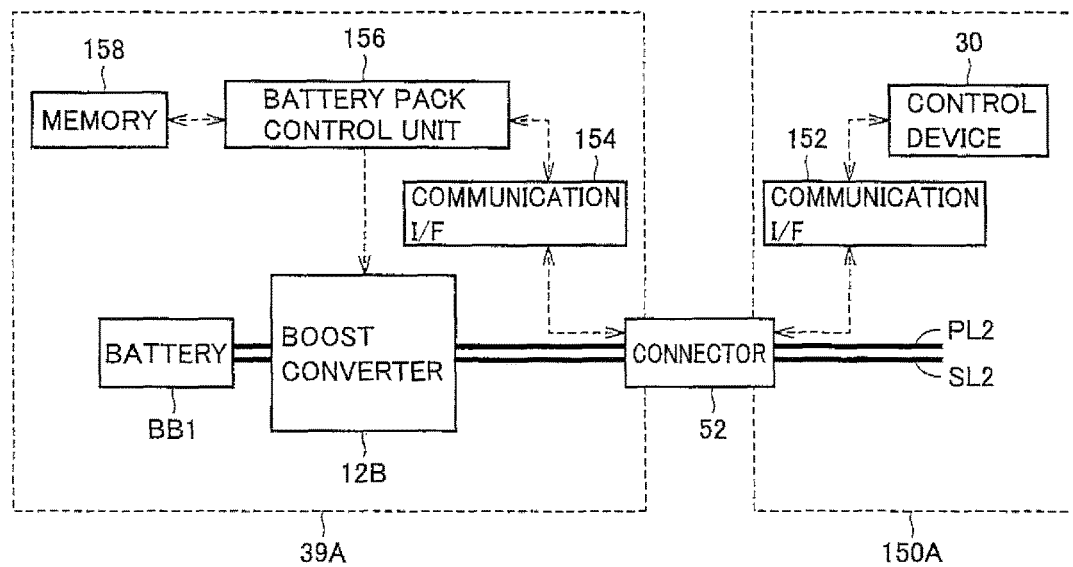
FIG. 13 shows connection between a vehicle and a battery pack in a second embodiment.

FIG. 13 shows connection between a vehicle and a battery pack in a second embodiment.

Referring to FIG. 13, a vehicle 150A and a battery pack 39A are connected by connector 52. In addition to a connection unit for power cables 106 and 110 as shown in FIG. 4, connector 52 is provided with a connection unit for a communication line for performing control communication such as CAN (Controller Area Network) communication. It is not always necessary to integrate a connector for the communication line with a connector for the power cables, and they may be provided as separate connectors.

Battery pack 39A includes sub battery BB1, boost converter 12B boosting the voltage of sub battery BB1, a battery pack control unit 156 controlling boost converter 12B, and a memory 158 and a communication interface 154 connected to battery pack control unit 156. Boost converter 12B is connected to power supply line PL2 and ground line SL2 on the vehicle side via connector 52.

In addition to the configuration of vehicle 1 as shown in FIG. 1, vehicle 150A further includes a communication interface 152 for performing communication with battery pack 39A.

Memory 158 stores information related to battery pack 39A. The information includes, for example, the capacity of sub battery BB1. Memory 158 may store a type (a lithium ion battery, a nickel hydride battery, or the like), the date of manufacture, a manufacturer, and the like of the battery.

Battery pack control unit 156 reads information on the capacity of battery pack 39A from memory 158, and transmits the information to control device 30 via communication interfaces 154 and 152. Control device 30 switches the control constant, various maps, and the like for driving the vehicle, taking the capacity of battery pack 39A into consideration. Switching of the maps may be performed by selecting a suitable map among a plurality of maps held in control device 30, or performing rewrite processing by reflecting map data held in memory 158 in a map stored in control device 30.

Figure 14:
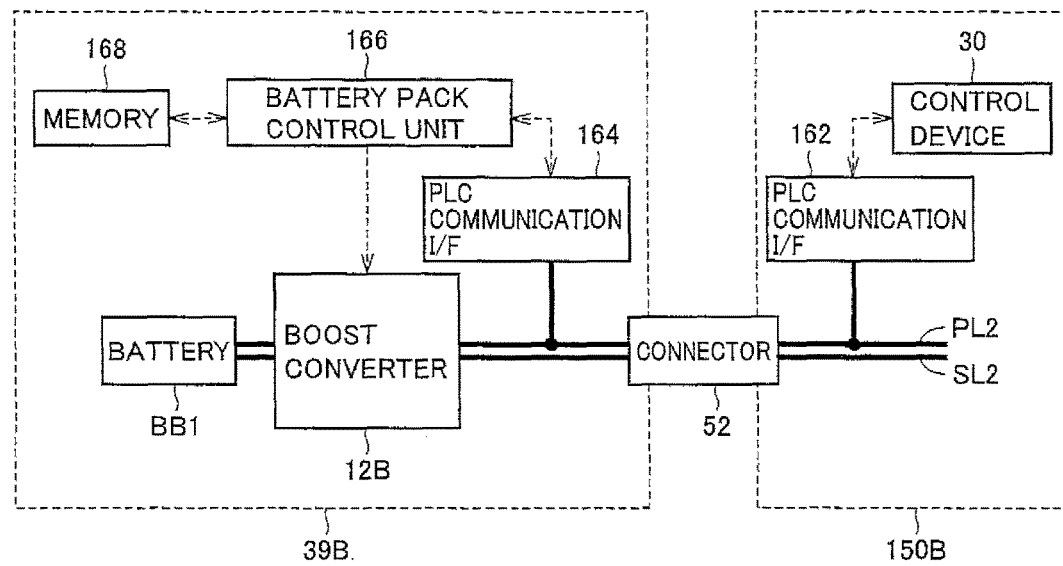
FIG. 14 shows a modification of a configuration shown in FIG. 13.

FIG. 14 shows a modification of a configuration shown in FIG. 13.

While the power cables and the communication line are provided separately in FIG. 13, a PLC (Power Line Communications) interface superimposing communication information on a power cable is employed in FIG. 14, and thus an extra communication line is not required.

Battery pack 39B includes sub battery BB1, boost converter 12B boosting the voltage of sub battery BB1, a battery pack control unit 166 controlling boost converter 12B, and a memory 168 and a PLC communication interface 164 connected to battery pack control unit 166. Boost converter 12B is connected to power supply line PL2 and ground line SL2 on the vehicle side via connector 52.

In addition to the configuration of vehicle 1 as shown in FIG. 1, a vehicle 150B further includes a PLC communication interface 162 for performing communication with battery pack 39B.

Memory 168 stores information related to battery pack 39B. The information includes, for example, the capacity of sub battery BB1.

Battery pack control unit 166 reads information on the capacity of battery pack 39B from memory 168, and transmits the information to control device 30 via PLC communication interfaces 164 and 162 and the power cables. Control device 30 switches the control constant, various maps, and the like for driving the vehicle, taking the capacity of battery pack 39B into consideration.

Figure 15:
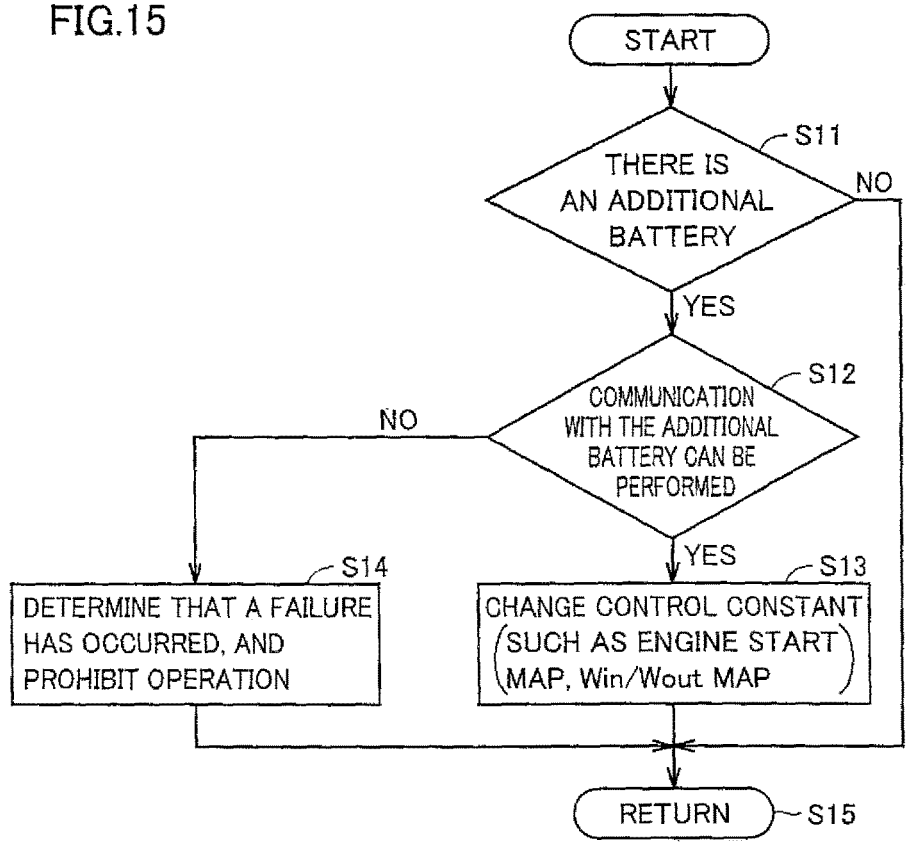
FIG. 15 is a flowchart for illustrating control associated with connection of an additional battery pack performed by control device 30 in the second embodiment.

FIG. 15 is a flowchart for illustrating control associated with connection of an additional battery pack performed by control device 30 in the second embodiment. Processing in the flowchart is, for example, invoked from a main routine and performed when the vehicle's system is started.

Referring to FIG. 15, firstly, when the processing is started, control device 30 determines in step S11 whether or not an additional battery pack is connected. If detection switch 122 of connector 52 is in an ON state, it is determined that connection is established. If switches 122 are in an OFF state, it is determined that no connection is established.

When it is determined in step S11 that there is no additional battery, the processing proceeds to step S15, and the control is transferred to the main routine without special change in the control. When it is determined that there is an additional battery, the processing proceeds to step S12.

In step S12, it is determined whether or not communication with the additional battery pack can be performed. When the communication can be performed, the communication allows information such as the capacity of the sub battery to be read from the memory in the battery pack.

When the communication can be performed in step S12, the processing proceeds to step S13. In step S13, a control constant used by control device 30 for controlling a hybrid system is changed. The control constant can be changed, for example, by switching an engine start map defining a threshold for starting the engine with respect to a required output power value, a map defining the maximum electric power Wout that can be output from the batteries or the maximum electric power Win that can be charged in the batteries, and the like, according to the battery capacity.

On the other hand, when the communication is not established in step S12, the processing proceeds to step S14. Examples of cases where the communication is not established include a case where a non-standard battery pack that is not expected to be connected (for example, a battery pack that is not a genuine product, or a battery pack for which it is unknown whether it satisfies the standard) is connected. In that case, since it is unknown how to change the control constant appropriately, it is determined that a failure has occurred, and operation of the vehicle is prohibited to prevent abnormal discharge and the like.

Specifically, preferably, control device 30 determines whether or not battery pack 39A or 39B is an authorized product based on the information read from memory 158 or 168 serving as a storage unit.

When a battery pack that is not an authorized product is mounted, for example, the operation of the vehicle is prohibited. Thereby, a malfunction such as abnormal charge and discharge can be avoided. Alternatively, the vehicle may be operated by electrically disconnecting an unauthorized battery pack and using only an authorized battery pack. This can ensure the operation of the vehicle in a case where a user connects a battery pack to his/her purchased vehicle without recognizing that the battery pack is not an authorized product.

The configuration described above makes unauthorized modification difficult, when compared with a case where only the shape of the connector is used for determination. Specifically, although the connector can be easily copied, it is difficult to perform copying with the contents of the memory included. Therefore, the configuration described above prevents an unauthorized battery pack from being mounted and causing a malfunction.

When the processing in step S13 or S14 is terminated, the control is transferred to the main routine in step S15.

As has been described above, also in the second embodiment, on-vehicle equipment is controlled under control conditions suitable for a mounted battery pack, as in the first embodiment.

Third Embodiment

A battery generates heat when it charges or discharges a current. In addition, a battery may have a high temperature when it is left under the scorching sun for a long time in summer or the like. It is desirable to cool a battery for use in order not to decrease the battery's life.

However, when the amount of mounted batteries is changed, the amount of heat generated from the batteries is also changed. Therefore, it is necessary to change cooling capability according to the amount of mounted batteries.

Figure 16:
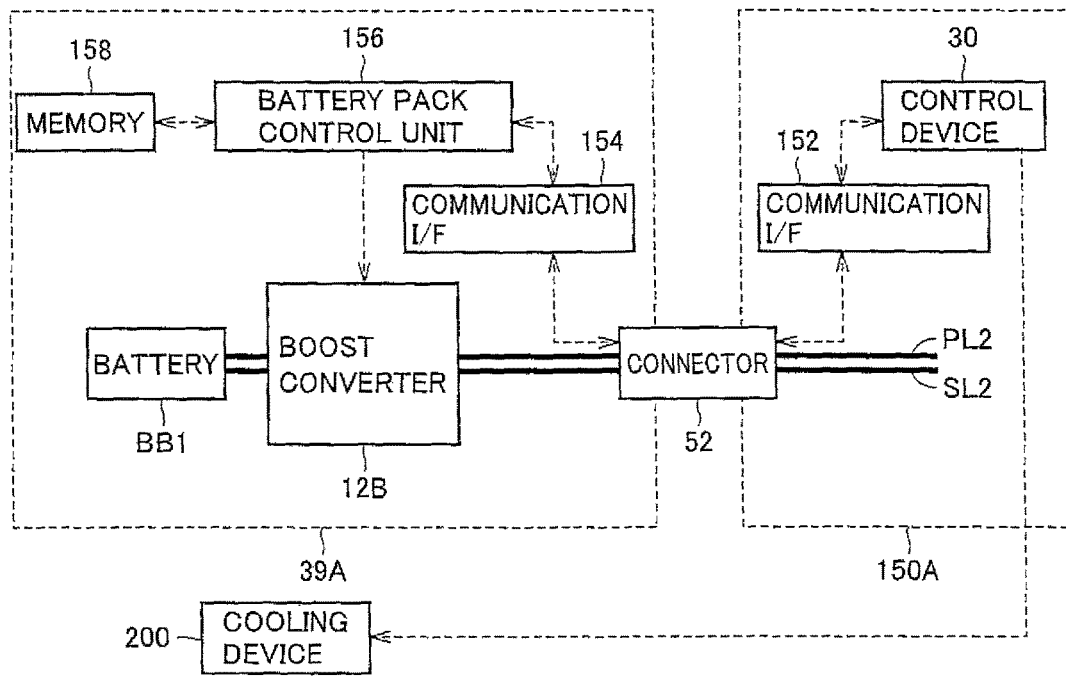
FIG. 16 is a block diagram for illustrating a cooling device in a third embodiment.

FIG. 16 is a block diagram for illustrating a cooling device in a third embodiment.

In a configuration shown in FIG. 16, a cooling device 200 is added to the configuration shown in FIG. 13. Since the components other than cooling device 200 have been described in FIG. 13, the description thereof will not be repeated.

Cooling device 200 is provided on the vehicle side to cool battery pack 39A. Cooling device 200 may be the one also cooling battery BA serving as a base battery, in addition to battery pack 39A.

In a case where cooling device 200 is provided exclusively for battery pack 39A, when control device 30 of the vehicle detects that battery pack 39A has been mounted by the communication with battery pack control unit 156, control device 30 sets cooling device 200 to be operable. When control device 30 detects an increase in temperature of battery BB1 by a temperature sensor not shown or the like, control device 30 causes cooling device 200 to start cooling battery pack 39A by rotating a fan and circulating cooling water.

In a case where cooling device 200 is provided in common for the base battery and battery pack 39A, when control device 30 of the vehicle detects that battery pack 39A has been mounted by the communication with battery pack control unit 156, control device 30 increases cooling capability of cooling device 200. When battery pack 39A is mounted, control device 30 increases the rotation speed of the fan and increases the amount of circulated cooling water, when compared to a case where battery pack 39A is not mounted.

Herein, in a case where a battery cooling device and an ECU controlling the same are provided separately from a battery pack as shown in FIG. 16, battery cooling performance may vary, and vehicle performance such as the travel distance that can be achieved by batteries only may be degraded.

Figure 17:
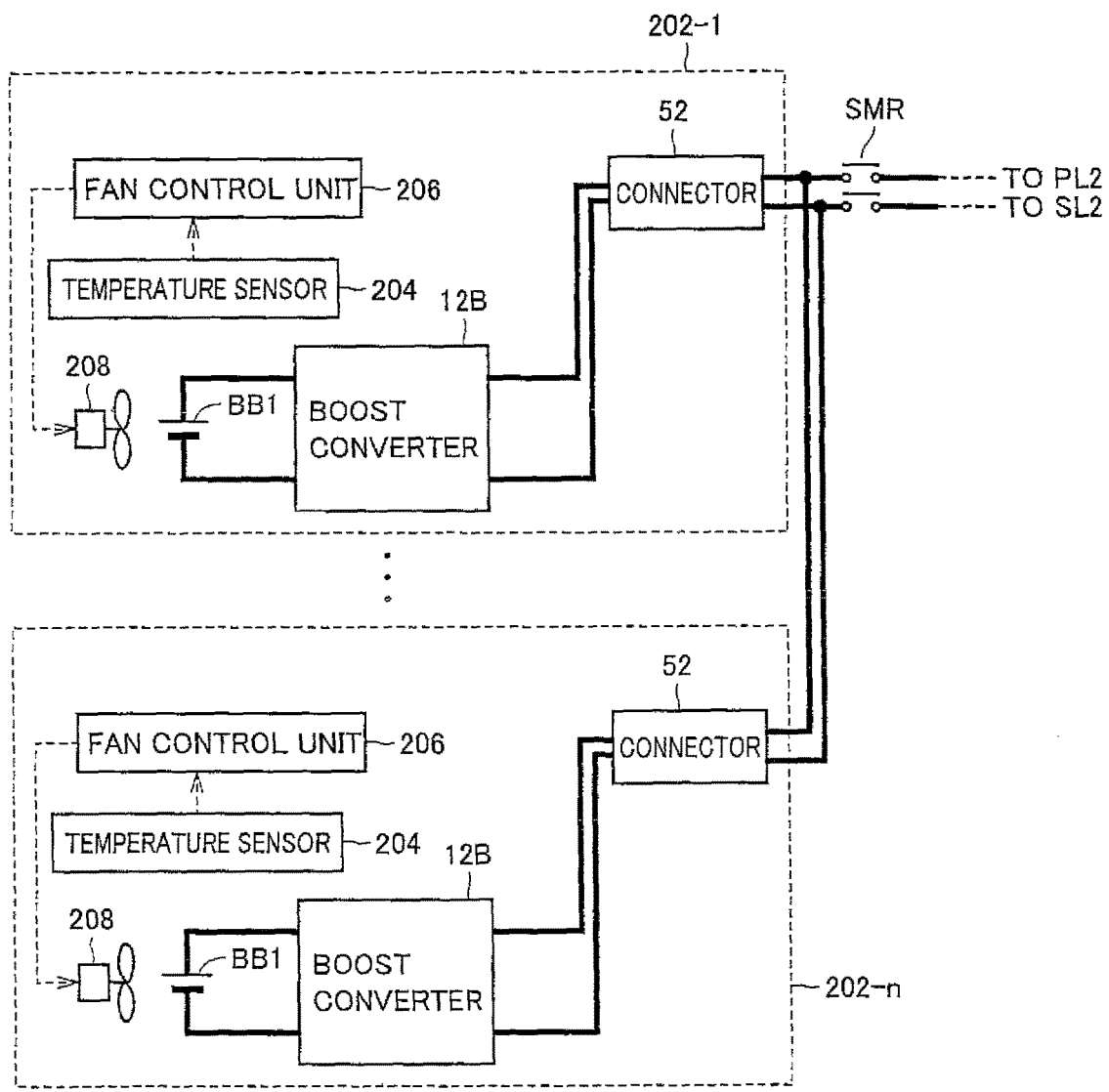
FIG. 17 shows a modification of a configuration of a battery pack used in the third embodiment.

FIG. 17 shows a modification of the configuration of the battery pack used in the third embodiment.

Referring to FIG. 17, a plurality of battery packs 202-1 to 202-n are connected to power supply line PL2 and ground line SL2 via a system main relay SMR. Conductive/nonconductive states of system main relay SMR are controlled by the control device on the vehicle side.

Battery pack 202-1 includes connector 52, boost converter 12B, sub battery BB1, a temperature sensor 204, a fan control unit 206, and an air blowing fan 208.

Temperature sensor 204 measures a temperature of sub battery BB1. When a battery temperature detected by temperature sensor 204 is higher than a prescribed value, fan control unit 206 rotates fan 208 and adjusts the temperature to prevent an excessive increase in the battery temperature. Specifically, temperature sensor 204, fan control unit 206, and fan 208 correspond to a temperature adjustment device included in battery pack 202-1.

Other battery pack 202-n also has the same configuration as that of battery pack 202-1, and the description thereof will not be repeated.

In the third embodiment, a temperature adjustment device including a fan and the like is provided for each battery pack. Therefore, even when there is a change in the number or shape of battery packs, a sub battery incorporated into a battery pack can be kept at an appropriate temperature without the need for taking special consideration. In other words, since a cooling device and a control unit therefor are incorporated into a battery pack, and cooling control (from temperature measurement to fan control) is completed in the battery pack, degradation in battery cooling performance caused when a battery pack is added and resultant degradation in travel performance can be prevented.

Finally, an on-vehicle equipment control system disclosed in the present embodiment will be summarized. Referring to FIGS. 1, 13, and 14, an on-vehicle equipment control system includes battery pack 39A, 39B configured to be attachable to and detachable from a vehicle and including a storage unit (memory 158, 168) storing information, and control device 30 controlling on-vehicle equipment based on the information stored in the storage unit when the battery pack is connected to the vehicle, and controlling the on-vehicle equipment based on information other than the information stored in the storage unit when the battery pack is not connected to the vehicle.

As shown in FIG. 16, preferably, the on-vehicle equipment control system further includes cooling device 200 cooling battery pack 39A. Control device 30 controls cooling device 200 based on the information stored in the storage unit (memory 158).

As shown in FIGS. 1 and 13, preferably, the on-vehicle equipment control system further includes first battery BA supplying electric power to the on-vehicle equipment. Battery pack 39 further includes second battery BB1 supplying electric power to the on-vehicle equipment. Control device 30 causes inverters 14, 22, boost converters 12A, 12B, and the like serving as the on-vehicle equipment to perform control related to the first battery BA and control related to the second battery BB1 based on the information stored in the storage unit (memory 158).

Preferably, the controls related to the first and second batteries include charge and discharge control, and control device 30 controls charge and discharge of the battery pack based on the information stored in the storage unit.

As shown in FIGS. 1 and 5, an on-vehicle equipment control system in accordance with another aspect of the present invention includes battery pack 39 having a connection unit (connector 52) for attachably and detachably connecting to a vehicle, a shape detection unit (switch 122) provided to the vehicle for detecting a shape of the connection unit, and control device 30 controlling on-vehicle equipment based on a detection result of the shape detection unit.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:
1. A vehicle, comprising:
a driving device driving said vehicle using electric power;
a control device controlling said driving device;
a first battery supplying electric power to said driving device; and
a battery pack, said battery pack including,
a second battery used in addition to said first battery for supplying electric power to said driving device,
a communication device performing communication with said control device;
said control device allowing said driving device to drive the vehicle in response to communication to said communication device being successfully established while said battery pack is connected to said vehicle, and prohibiting said driving device from driving the vehicle or restricting power from the second battery in response to communication to said communication device not being established while said battery pack is connected to said vehicle.

2. The vehicle according to claim 1, wherein
the control device makes a determination as to whether or not the battery pack is authorized,
the control device allows said driving device to drive the vehicle in response to the determination indicating the battery pack is authorized, and
the control device prohibits said driving device from driving the vehicle or restricts power from the second battery in response to the determination indicating the battery pack is unauthorized.

* * * * *